(12) United States Patent
Fernando et al.

(10) Patent No.: US 11,167,524 B2
(45) Date of Patent: Nov. 9, 2021

(54) COMPOSITE SHEET MATERIAL

(71) Applicant: Gerard Fernando, Birmingham (GB)

(72) Inventors: Gerard Fernando, Birmingham (GB);
Mark Paget, Birmingham (GB)

( * ) Notice: Subject to any disclaimer, the term of this patent is extended or adjusted under 35 U.S.C. 154(b) by 187 days.

(21) Appl. No.: 16/306,772

(22) PCT Filed: Jun. 2, 2017

(86) PCT No.: PCT/GB2017/051595
§ 371 (c)(1),
(2) Date: Dec. 3, 2018

(87) PCT Pub. No.: WO2017/208017
PCT Pub. Date: Dec. 7, 2017

(65) Prior Publication Data
US 2019/0232605 A1   Aug. 1, 2019

(30) Foreign Application Priority Data
Jun. 2, 2016   (GB) .................................... 1609689

(51) Int. Cl.
*B32B 5/02* (2006.01)
*B32B 7/12* (2006.01)
(Continued)

(52) U.S. Cl.
CPC ............... *B32B 5/02* (2013.01); *B29C 70/50* (2013.01); *B29C 70/502* (2013.01); *B29C 70/54* (2013.01);
(Continued)

(58) Field of Classification Search
CPC ....... B32B 15/14; B32B 3/14; B32B 2250/03; B32B 3/085; B32B 3/08; B32B 37/26;
(Continued)

(56) References Cited

U.S. PATENT DOCUMENTS 3,328,218 A   6/1967 Noyes
3,597,126 A * 8/1971 Brumbaugh .......... B05B 5/1683
                                                                  417/555.1
(Continued)

FOREIGN PATENT DOCUMENTS

CN         1649725        1/2002
EP         0642926        3/1995
(Continued)

OTHER PUBLICATIONS

Special Printing Technology p. 142.

*Primary Examiner* — Vishal I Patel
(74) *Attorney, Agent, or Firm* — Renner Kenner Greive Bobak Taylor & Weber

(57) ABSTRACT

A method of forming a composite sheet material, the method comprises energising a pair of electrodes to apply an electrostatic charge to a bed of fibres located therebetween thereby orienting at least some of the fibres to be substantially orthogonal to the electrodes and sandwiching at least some of the oriented fibres between a first sheet and a second sheet. The first sheet may be subsequently removed. A third sheet may be used to sandwich the fibres between the second sheet and the third sheet. Apparatus (100) is disclosed for carrying out the method.

9 Claims, 5 Drawing Sheets

(51) Int. Cl.

| | | |
|---|---|---|
| *D04H 11/00* | (2006.01) | |
| *B32B 15/08* | (2006.01) | |
| *B32B 29/02* | (2006.01) | |
| *B32B 3/18* | (2006.01) | |
| *B32B 27/12* | (2006.01) | |
| *B32B 3/14* | (2006.01) | |
| *B32B 3/02* | (2006.01) | |
| *B32B 3/08* | (2006.01) | |
| *B32B 15/14* | (2006.01) | |
| *B32B 3/06* | (2006.01) | |
| *B32B 3/16* | (2006.01) | |
| *B32B 5/16* | (2006.01) | |
| *B29C 70/50* | (2006.01) | |
| *B32B 37/26* | (2006.01) | |
| *B32B 38/00* | (2006.01) | |
| *B32B 37/24* | (2006.01) | |
| *B29C 70/54* | (2006.01) | |
| *B32B 37/12* | (2006.01) | |
| *B32B 38/10* | (2006.01) | |

(52) U.S. Cl.
CPC ............... *B32B 3/02* (2013.01); *B32B 3/06* (2013.01); *B32B 3/08* (2013.01); *B32B 3/085* (2013.01); *B32B 3/14* (2013.01); *B32B 3/16* (2013.01); *B32B 3/18* (2013.01); *B32B 5/16* (2013.01); *B32B 7/12* (2013.01); *B32B 15/08* (2013.01); *B32B 15/14* (2013.01); *B32B 27/12* (2013.01); *B32B 29/02* (2013.01); *B32B 37/12* (2013.01); *B32B 37/24* (2013.01); *B32B 37/26* (2013.01); *B32B 38/0008* (2013.01); *D04H 11/00* (2013.01); *B32B 38/10* (2013.01); *B32B 2038/0072* (2013.01); *B32B 2250/03* (2013.01); *B32B 2250/04* (2013.01); *B32B 2250/05* (2013.01); *B32B 2307/558* (2013.01); *B32B 2310/025* (2013.01)

(58) Field of Classification Search
CPC ......... B32B 3/02; B32B 5/02; B32B 38/0008; B32B 2250/05; B32B 2310/025; B32B 27/12; B32B 2038/0072; B32B 37/12; B32B 29/02; B32B 37/24; B32B 15/08; B32B 2307/558; B32B 3/06; B32B 7/12; B32B 3/18; B32B 5/16; B32B 3/16; B32B 38/10; B32B 2250/04; B29C 70/50; B29C 70/502; B29C 70/54; D04H 11/00
See application file for complete search history.

(56) References Cited

U.S. PATENT DOCUMENTS

| | | |
|---|---|---|
| 3,843,756 A | 10/1974 | Talbott |
| 3,973,059 A | 8/1976 | Brown et al. |
| 5,047,103 A | 9/1991 | Abrams et al. |
| 5,858,156 A | 1/1999 | Abrams et al. |
| 6,517,952 B1 | 2/2003 | Gustafsson |
| 2008/0003394 A1* | 1/2008 | Eke .................... B42D 25/47 428/41.8 |
| 2008/0274326 A1* | 11/2008 | Kim .................... B29C 70/24 428/90 |
| 2015/0004365 A1* | 1/2015 | Nishimura ........... B29C 70/382 428/141 |

FOREIGN PATENT DOCUMENTS

| | | |
|---|---|---|
| JP | 62162062 | 7/1987 |
| WO | 9967089 | 12/1999 |
| WO | WO9967089 | 12/1999 |
| WO | 2008054759 | 5/2008 |
| WO | WO2008054759 | 5/2008 |
| WO | 2015084709 | 6/2015 |
| WO | WO2015084709 | 6/2015 |

* cited by examiner

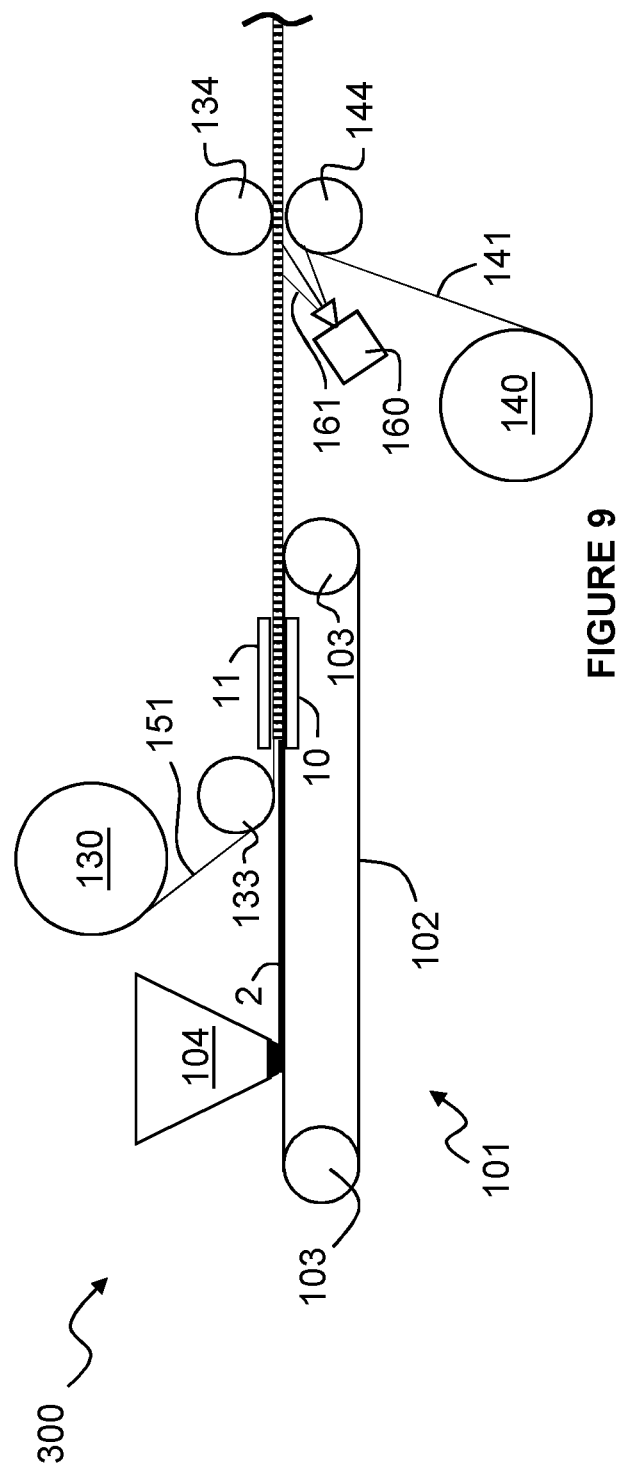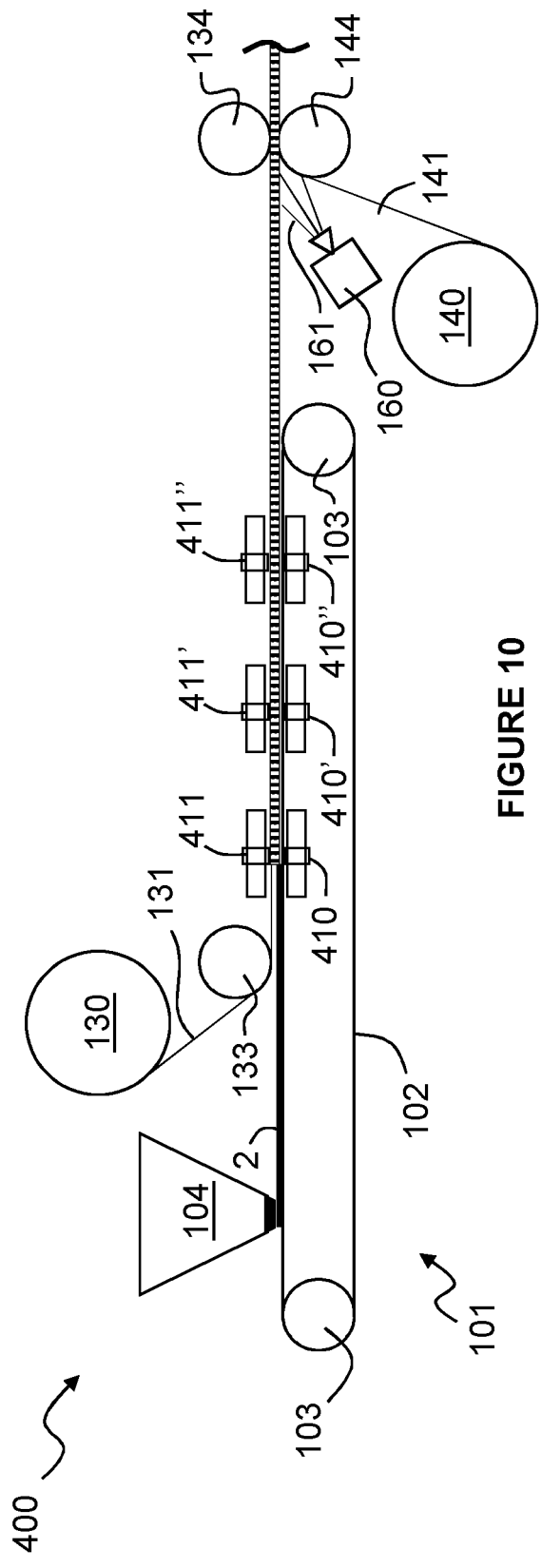

COMPOSITE SHEET MATERIAL

This invention relates generally to composite sheet materials. More specifically, although not exclusively, this invention relates to composite sheet materials incorporating a pair of plies or skins separated by a structural core layer to provide a sandwich structured composite.

Sandwich structured composites typically include thin but strong outer skins with a lightweight, but relatively thick core structure. The skins can be selected to provide desired bending properties, while the core structure can be selected to provide desired compressive properties.

Skins are often formed laminates of glass or carbon fiber-reinforced thermoplastics or thermoset polymers (unsaturated polyesters, epoxies and the like) or sheet metal. Core structures can take many forms, for example open and closed cell structured foams, such as polyethersufone polyvinylchloride, polyurethane, polyethylene or polystyrene foams, balsa wood, syntactic foams, or honeycomb structures. Honeycomb structures are generally formed from a series of walls which extend perpendicularly with respect to the skins to form an array of cavities and can be formed of any number of materials, for example aluminium or engineering plastics, such as aramid polymers.

U.S. Pat. No. 3,328,218 describes a sandwich structured composite that includes coextensive parallel outer plies or sheets having columnar members mounted at right angles therebetween. The plies are formed of metal, rigid plastics such as styrene or impregnated fibreglass, cardboard and the like. The columnar members are formed of plastic (e.g. polystyrene, nylon or polyester), refractory (e.g. glass, asbestos or ceramic), metal (e.g. brass, copper, steel tantalum, molybdenum, tungsten or aluminium), or even hog bristle or sisal. The composite is formed by spraying an adhesive on a surface of the skin and depositing the columnar members on the surface using a flocking apparatus as the skin is passed over a plate that creates an electrostatic charge to orient the columnar members. Heat is then applied to set the adhesive and a further skin carrying an adhesive is placed over the columnar members, with heat being applied to set the adhesive on the further skin.

WO 99/67089 describes a structure for use as a thermal interface comprising flocked fibres, which are seated onto a base substrate with a curable adhesive.

WO 2008/054759 describes a sandwich structured composite comprising a first and second substrate, and flocked fibres secured therebetween with a curable adhesive. The flocked fibres are further encased in binder resin to enhance the properties of the composite.

U.S. Pat. No. 3,973,059 describes a method of making a flocked fabric using a pair of electrodes. The flocked fabric comprises a base layer onto which flocked fibres are secured with curable adhesive, e.g. an epoxy resin.

WO 2015/084709 A1 describes a composite panel for use in absorbing and detecting impact loads, for example, in sports and military protective gear. The composite panel comprises multiple substrates, with flocked fibres situated therebetween.

It is a first non-exclusive aim of the invention to provide a composite sheet material formed by an improved method, preferably one that is more reliable and/or simpler than known methods. It is a further non-exclusive aim of the invention to provide a composite sheet material with superior properties.

Accordingly, a first aspect of the invention provides a method of forming a composite sheet material, the method comprising locating a first sheet adjacent to a first of a pair of electrodes, energising the pair of electrodes to apply an electrostatic charge to a bed of fibres located therebetween thereby orienting at least some of the fibres to be substantially orthogonal to the electrodes and adhered to the first sheet, and sandwiching at least some of the oriented fibres between a the first sheet and a second sheet, characterised by removing the first sheet.

A further aspect of the invention provides a method of forming a composite sheet material. The method comprising locating a sacrificial sheet adjacent to a first of a pair of electrodes, energising the pair of electrodes to apply an electrostatic charge to a bed of fibres located therebetween thereby orienting at least some of the fibres to be substantially orthogonal to the electrodes and adhered to the sacrificial sheet, sandwiching at least some of the oriented fibres between the sacrificial sheet and a further sheet and removing the sacrificial sheet.

We have surprisingly found that using as a first sheet a sacrificial sheet we can achieve a more uniform and/or higher density packing of the fibres.

The bed of fibres may be located in a first position, which may be on or adjacent a first of the electrodes. Energising the electrodes may cause at least some of the fibres to move from the first position, for example toward a second of the electrodes. The method may comprise positioning a first sheet between the bed of fibres and the second electrode, for example such that at least some of the fibres that move from the first position, e.g. toward the second electrode, attach or adhere to the first sheet.

The first sheet may comprise an adhesive surface, which may comprise a pressure sensitive or non-curable adhesive or a structural or curable adhesive.

By pressure sensitive and/or non-curable adhesive, we mean an adhesive substance that adheres or attaches the surface of a substrate, i.e. a sheet, to the surface of another object, i.e. oriented fibres, in a non-permanent and releasable fashion. Minimal physical force is required to release the object from the substrate. Advantageously, this does not result in damage to either surface. Moreover, because the adhesive is pressure sensitive incompletely adhered fibres will fall back to the fibre bed when the electric charge is removed. This facilitates the cycling of the electric charge so as to cause non-adhered fibres to fall back to the bed of fibres from where it can be re-oriented.

By structural or curable adhesive, we mean an adhesive that adheres or attaches the surface of a substrate, i.e. a sheet, to the surface of another object, i.e. oriented fibres, in a permanent and non-releasable fashion. Curable adhesives usually undergo a chemical reaction to permanently bond the two surfaces together. This may be initiated using heat, a catalyst such as a chemical catalyst, or UV light, for example. Preferably, the object is permanently bonded to the substrate and cannot be removed without significant physical force, which results in damage to both surfaces.

The method may comprise positioning the first sheet with an adhesive surface thereof facing the bed of fibres, for example such that at least some of the fibres that move from the first position, e.g. toward the second electrode, adhere to the adhesive surface in the orthogonal orientation.

The method comprises sandwiching at least some of the oriented fibres between the first sheet and a second sheet. The second sheet may comprise an adhesive surface, which may comprise a pressure sensitive or non-curable adhesive or a structural or curable adhesive. The method may comprise positioning the second sheet with an adhesive surface thereof facing oriented fibres attached or adhered to the first sheet, e.g. such that sandwiching them causes at least some of them to adhere to the adhesive surface of the second sheet.

In embodiments, the adhesive surface of the second sheet comprises a structural or curable adhesive.

The method comprises removing the first sheet. The method may comprise sandwiching at least some of the oriented fibres between the second sheet and a third sheet. The third sheet may comprise an adhesive surface, which may comprise a pressure sensitive or non-curable adhesive or a structural or curable adhesive. The method may comprise positioning the third sheet with an adhesive surface thereof facing oriented fibres attached or adhered to the second sheet, e.g. such that sandwiching them causes at least some of them to adhere to the adhesive surface of the third sheet.

In embodiments, the adhesive surface of the first sheet comprises a pressure sensitive or non-curable adhesive and the adhesive surface of the second and third sheets comprise a structural or curable adhesive.

The method may comprise introducing resin between at least some of the oriented fibres. The resin may be introduced after the oriented fibres are sandwiched between the pair of sheets. The resin may be introduced after the fibres are oriented, but before they are sandwiched between the pair of sheets. The method may comprise curing or drying the resin between the oriented fibres. The method may comprise removing or draining or bleeding some of the resin from between the oriented fibres, e.g. before curing or drying the resin.

The method may comprise alternately interrupting and reapplying an electrostatic charge to the bed of fibres, for example to orient at least some of the fibres to be substantially orthogonal to the electrodes, e.g. prior to sandwiching at least some of the oriented fibres between a pair of sheets. The method may comprise alternately energising and de-energising the pair of electrodes, for example to alternately interrupt and reapply the electrostatic charge to the bed of fibres. The method may comprise moving the bed of fibres from the pair of electrodes to one or more further pairs of electrodes, for example to alternately interrupt and reapply the electrostatic charge to the bed of fibres.

At least one, e.g. both or each, of the electrodes may be patterned, for example to provide a pattern of oriented fibres in the composite sheet material. Additionally or alternatively, the method may comprise moving at least one of the electrodes to orient fibres in one or more predetermined regions and/or according to a predetermined pattern, for example to provide a pattern of oriented fibres in the composite sheet material. The pattern of oriented fibres may comprise one or more lines or channels, which may extend in a direction substantially parallel to the sheets.

The method may comprise conveying the bed of fibres, for example into and out of a space between the electrodes. The method may comprise feeding the first sheet, e.g. from a roll, into and out of the space between the electrodes, for example to a location between the bed of fibres and the second electrode.

The method may comprise feeding the second sheet, e.g. from a roll, to a location between a first pair of opposed rollers. The method may comprise sandwiching the oriented fibres between the first and second sheets using the first pair of opposed rollers.

The method may comprise feeding the third sheet, e.g. from a roll, to a location between a second pair of opposed rollers. The method may comprise sandwiching the oriented fibres between the second and third sheets using the second pair of opposed rollers.

The first sheet may be fed to an exhaust means or roller, which may be downstream of the first pair of opposed rollers, to remove the first sheet from the oriented fibres.

At least one of the sheets may be flexible. The method may comprise introducing resin between at least some of the oriented fibres. The method may comprise deforming the at least one sheet. The method may comprise curing or drying the resin, for example to cause the composite sheet to at least partially retain the deformed shape.

Another aspect of the invention provides an apparatus for forming a composite sheet material, for example according to the method described above, the apparatus comprising a pair of electrodes for applying an electrostatic charge to a bed of fibres located therebetween thereby orienting at least some of the fibres to be substantially orthogonal to the electrodes and sandwiching means for sandwiching at least some of the oriented fibres between a first and second sheet, characterised in that the apparatus further comprises an exhaust means, for example an exhaust roller, downstream of the sandwiching means for removing the first sheet.

The apparatus may comprise supply means, e.g. for supplying a first sheet between the bed of fibres and the second electrode, for example such that at least some of the fibres move toward the second electrode and attach or adhere to the first sheet. The supply means may comprise a first roller carrying a roll of the first sheet. The first sheet may comprise an adhesive surface, which may comprise a pressure sensitive or non-curable adhesive or a structural or curable adhesive.

The supply means may comprise a first sheet with an adhesive surface which faces the bed of fibres when it is supplied between the bed of fibres and the second electrode, e.g. such that at least some of the fibres that move toward the second electrode adhere to the adhesive surface in the orthogonal orientation.

The supply means may be configured to supply a second sheet, for example to the sandwiching means, e.g. for sandwiching at least some of the oriented fibres between the first sheet and a second sheet. The supply means comprises a second roller carrying a roll of the second sheet. The second sheet may comprise an adhesive surface, which may comprise a pressure sensitive or non-curable adhesive or a structural or curable adhesive, for example a photo-curable adhesive.

The supply means may comprise a second sheet with an adhesive surface which faces the oriented fibres attached or adhered to the first sheet, e.g. such that sandwiching them causes at least some of them to adhere to the adhesive surface of the second sheet.

In embodiments, the adhesive surface of the second sheets comprises a structural or curable adhesive.

The apparatus comprises exhaust means, downstream of the sandwiching means, for removing the first sheet. The exhaust means may comprise an exhaust roller.

The supply means may be configured to supply a third sheet, for example to the or a further sandwiching means, e.g. for sandwiching at least some of the oriented fibres between the second sheet and a third sheet. The supply means comprises a third roller carrying a roll of the third sheet. The third sheet may comprise an adhesive surface, which may comprise a pressure sensitive or non-curable adhesive or a structural or curable adhesive.

The supply means may comprise a third sheet with an adhesive surface which faces the oriented fibres attached or adhered to the second sheet such that sandwiching them causes at least some of them to adhere to the adhesive surface of the third sheet.

In embodiments, the adhesive surface of the first sheet comprises a pressure sensitive or non-curable adhesive and the adhesive surface of the second and third sheets comprise a structural or curable adhesive.

The apparatus may comprise an adhesive introduction means, e.g. for introducing or applying adhesive to one or more of the sheets. The apparatus may comprise resin introduction means, e.g. for introducing or applying resin between at least some of the oriented fibres. At least one or each of the adhesive introduction means or the resin introduction means may comprise a feeding device, such as a pumping or gravity feeding device, or a spraying device.

The apparatus may comprise curing or drying means for curing or drying the adhesive or the resin. The curing or drying means may comprise a heater. Additionally or alternatively, curing or drying means may comprise a light source, microwave, radio frequency, etc.

The apparatus may comprise a control means, such as a control unit, control module or controller. The control means may be operable or configured or programmed to control or for controlling one or more features of the apparatus, for example to carry out one or more steps or features of the method described above. The control means may be for controlling the electrodes. The control means may be configured or programmed to alternately interrupt and reapply an electrostatic charge to the bed of fibres, for example to orient at least some of the fibres to be substantially orthogonal to the electrodes.

The apparatus may comprise conveying means, e.g. for conveying the bed of fibres into and out of the space between the electrodes. The conveying means may comprise one or more rollers, e.g. for contacting or carrying one or more of the sheets. At least one of the rollers may be driven by a drive mechanism.

The electrode pair may comprise a first electrode pair and/or the apparatus comprises one or more further electrode pairs. The one or more further electrode pairs may comprise second and optionally third, fourth, fifth or subsequent pairs. The further electrode pair(s) may be between the first electrode pair and the sandwiching means. The conveying means may be configured to convey the bed of fibres from the first electrode pair to the further electrode pair(s), e.g. for alternately applying and interrupting an electrostatic charge to the bed of fibres and/or to orient at least some of the fibres to be substantially orthogonal to the electrodes.

At least one of the electrodes may be patterned, for example to provide a pattern of oriented fibres in the composite sheet material. The pattern may comprise one or more lines, for example to provide one or more lines or channels between the fibres, which may extend in a direction substantially parallel to the sheets.

Additionally or alternatively, at least one of the electrodes may be movable, e.g. relative to the bed of fibres and/or relative to at least one of the sheets and/or relative to at least one other electrode. The movable electrode(s) may be movable to orient fibres in one or more predetermined regions and/or according to a predetermined pattern, for example to provide a pattern of oriented fibres in the composite sheet material. The control means may be operable, configured or programmed to cause the movable electrode(s) to move along a path to orient fibres in one or more regions and/or according to or to create a pattern, which region or patterns may comprise or produce or provide one or more lines or channels between the fibres, which may extend in a direction substantially parallel to the sheets.

The or each sandwiching means may comprise opposed elements, which may be configured or operable, e.g. positioned or movable, to compress the oriented fibres between the sheets. At least one of the opposed elements may comprise a roller.

Another aspect of the invention provides a composite sheet material, which may be formed by the method described above and/or using the apparatus described above.

A further aspect of the invention provides a product, preform, precursor, element or intermediate product of a composite sheet material, which may be made or produced using one or more steps or features of the method or apparatus described above.

Yet another aspect of the invention provides an intermediate product of a composite sheet material comprising a sheet with a plurality of fibres on a surface thereof which are held substantially orthogonal thereto by a pressure sensitive or non-curable adhesive.

The product may comprise a further sheet, which may be adhered to the plurality of fibres, for example by a structural or curable adhesive such that the fibres are sandwiched between the sheets.

Another aspect of the invention provides a composite sheet material comprising first and second sheets between which are sandwiched a plurality of fibres substantially orthogonal to the sheets, wherein the fibres are adhered to the first sheet by a pressure sensitive or non-curable adhesive and to the second sheet by a structural or curable adhesive.

The fibres may comprise any length suitable for the particular application. In embodiments, the length of the fibres may be 10 mm or more. Alternatively, the length of the fibres may be 10 mm or less.

Yet another aspect of the invention provides a composite sheet material comprising first and second sheets between which are sandwiched a plurality of fibres substantially orthogonal to the sheets, wherein the length of the fibres is 10 mm or less.

The length of the fibres may be 5 mm or less, for example 4 mm or less, such as between 1 mm and 4 mm or between 2 mm and 4 mm, such as about 3 mm. In embodiments, the fibres comprise microfibers, e.g. fibres of less than 1 mm or fibres of 100 μm or less, e.g. 10 μm or less. In embodiments, the fibres comprise nanofibres, e.g. fibres of less than 1 μm or fibres of 100 nm or less, e.g. 10 nm or less. The length of fibres may comprise an average or mean or median fibre length.

One or more areas of the product or of the composite sheet material may be absent of fibres, for example to provide a pattern. The pattern may comprise one or more lines or channels, which may be formed between the sheets.

At least one of the sheets may be flexible. At least one of the sheets, for example the first and/or second and/or third sheets, may comprise a plastics material, which may be a fibre reinforced plastics material such as carbon or glass fibre reinforced fibre material, or a metal or metallic material, such as a sheet metal. In embodiments, the first sheet comprises a paper or polymeric release sheet.

By release sheet, we mean a sacrificial sheet that is disposable and does not comprise part of the final product. The release sheet may comprise an adhesive surface, the adhesive surface may comprise a pressure sensitive and/or non-curable adhesive. The release sheet may be removable from the intermediate product, requiring minimal physical force without causing damage to the intermediate product. Advantageously, this allows the quality of the intermediate product containing oriented fibres adhered to the first sheet, i.e. the release sheet, to be assessed before permanently bonding the oriented fibres to the valuable second sheet using a structural or curable adhesive.

More advantageously, the intermediate product comprises a release sheet as the first sheet and a plurality of fibres on a surface thereof which are held substantially orthogonal thereto by a pressure sensitive or non-curable adhesive, may be further processed. For example, the release sheet may contain areas in which the fibres are misaligned. The electrodes may be re-energised to correctly align the fibres by re-orientation without wastage of the fibres or any valuable second sheet material.

Alternatively, an area of adhered fibres may be removed from the release sheet, and other types of oriented fibres may be adhered to these unoccupied areas in a further step, before permanent adhesion to the second sheet.

The structural or curable adhesive may be cured. The product or composite sheet material may comprise resin on the cured adhesive and/or between at least some of the fibres. The resin may be cured or dried. At least one sheet may be deformed, for example to a shape that is at least partially retained by the cured or dried resin.

Another aspect of the invention provides a composite sheet material comprising first and second sheets between which are sandwiched a plurality of fibres substantially orthogonal to the sheets, wherein at least one sheet is deformed to a shape that is at least partially retained by a cured or dried resin.

For the avoidance of doubt, any of the features described herein apply equally to any aspect of the invention. For example, the apparatus may comprise any one or more features of the method relevant thereto and vice versa. Similarly, the intermediate product or composite sheet material may comprise any one or more features relevant to one or more features of the method or apparatus and/or the intermediate product may comprise one or more features of the composite sheet material and vice versa.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Embodiments of the invention will now be described by way of example only with reference to the accompanying drawings in which:

FIG. 9 is a schematic representation of an apparatus according to yet another embodiment of the invention for forming a composite sheet material;

FIG. 10 is a schematic representation of an apparatus according to a yet further embodiment of the invention for forming a composite sheet material.

Figure 1:
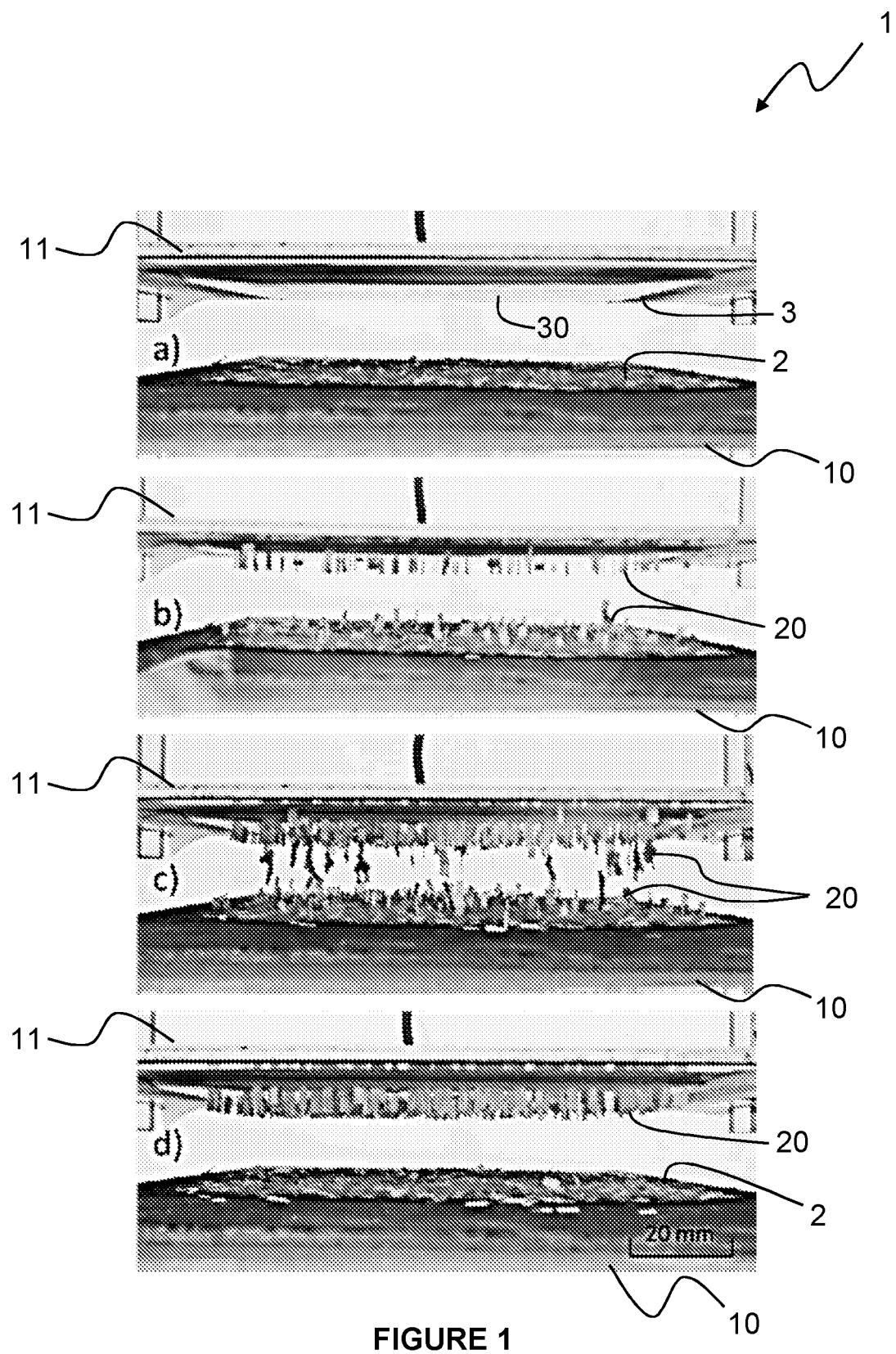
FIG. 1 shows a series of images that illustrate the orientation and loading of fibres onto a first sheet in a method according to an embodiment of the invention.

Referring to FIGS. 1 to 6, the invention provides a method of forming a composite sheet material using an apparatus 1 having a pair of spaced horizontal electrode or capacitor plates 10, 11. As shown in FIG. 1a, a bed 2 of fibres 20 is placed on a first, lowermost electrode plate 10 and a first, release sheet 3 is secured to a second, uppermost electrode plate 11. The release sheet 3 includes a pressure sensitive adhesive 30 on the major surface thereof that faces the first electrode plate 10. The release sheet 3 can be formed from any suitable material, such as a paper or plastic film.

As shown in FIG. 1b, the electrode plates 10, 11 are then energised to apply an electrostatic charge to the bed 2, thereby causing at least some of the fibres 20 to be oriented substantially orthogonal to the electrode plates 10, 11. Continued application of the electrostatic charge causes at least some of the oriented fibres 20 to move from the bed 2 toward the second electrode plate 11. These fibres 20 adhere to the adhesive 30 of the first sheet 3 and their orientation is maintained through gravitational forces by virtue of their own weight. As shown in FIG. 1c, continued application of the electrostatic charge also causes fibres 20 to form chains depending from the first sheet 3. However, when the electrode plates 10 are de-energised the fibres 20 not adhered to the adhesive 30 of the first sheet 3 fall back into the bed 2 as shown in FIG. 1d. Optionally, power to the electrode plates 10, 11 may be cycled to alternately energise, de-energise and re-energise them in order to create a more dense array of oriented fibres 20 on the first sheet 3.

Figure 2:
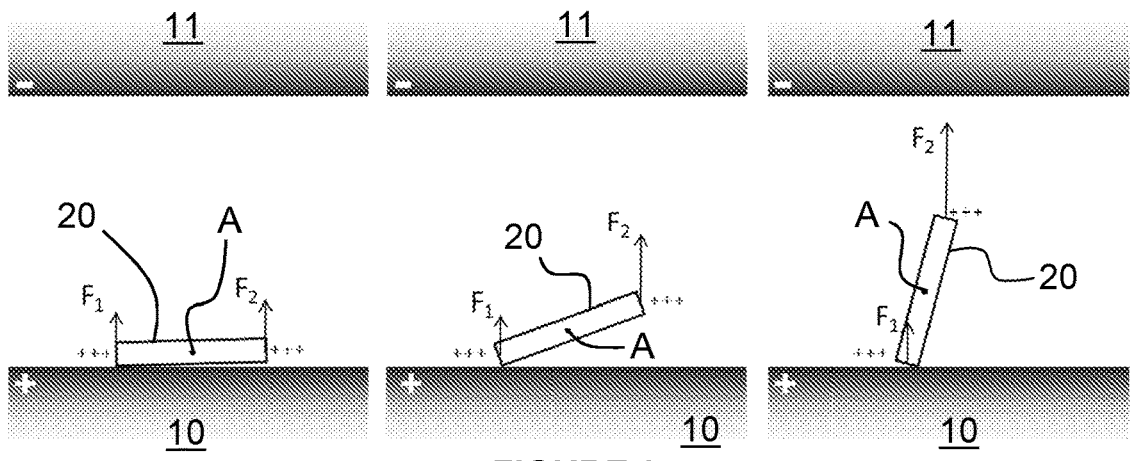
FIG. 2 is a schematic representation of the movement of one of the fibres during the orientation stage shown in FIG. 1.

FIG. 2 illustrates the electrostatic orientation of one of the fibres 20. In this embodiment, the first, lowermost electrode plate 10 is positively charged and the second, uppermost electrode plate 11 is negatively charged. Accumulation of charge is non-uniform due to the position of the fibre 20 in the bundle 2, which results in the force $F_1$ at a first, lower end of fibre 20 being less than the force $F_2$ at a second, higher end thereof. An initial orienting torque is therefore provided about a central point A. The force $F_2$ at the second, higher end therefore lifts the fibre 20 toward the second electrode plate 11, reducing the distance between them and therefore increasing $F_2$ further. The process continues until the fibre 20 is aligned with the vertical.

The motion of the fibre 20 under the influence of the electrostatic field may be broken down into two components: rotational motion about the central point A, and vertical acceleration toward the second, uppermost electrode plate 11 and the positive x direction can be considered to be upward in this case.

Because the initial positioning of the fibre 20 is not totally flat against the positive plate, the charge distribution will be non-symmetric, with the 'higher' end having a slightly greater net charge $\delta Q_2$ than the net charge $\delta Q_1$ at the lower end.

By use of the infinite plate approximation, which is valid under the regime that the plate area is large compared to the distance between the plates, Gauss' Law can be used to find the electric field between the electrode plates 10, 11. This yields a uniform electric field E given by:

$$E = \frac{\sigma}{\epsilon_0 \epsilon_r}$$

where $\epsilon_0$ is the permittivity of free space and $\epsilon_r$ is the relative permittivity of the dielectric. For air, $\epsilon_r$ is approximately equal to 1.

Both the charges $\delta Q_2$ and $\delta Q_1$ exert a torque on the fibre 20 that acts through its centre, central point A. The magnitude of the torque T produced by each end is given by:

$$\tau = Fd$$

where F is the force on each end exerted by the electric field and d is the perpendicular distance from the action point of the force to the central point A. If the radius of the fibre 20 is considered to be r and its length 2L and the forces are assumed to act from the ends of the fibre 20, these forces act at a distance L from the centre. $\delta Q_2$ produces an anticlockwise moment, whereas $\delta Q_1$ produces a clockwise moment. As $\delta Q_2 > \delta Q_1$, the anticlockwise moment is greater. The net torque $\tau_N$ is given by:

$$\tau_N = (\delta Q_2 - \delta Q_1) EL \cdot \sin(\theta),$$

where E is the electric field between the electrode plates 10, 11 as given above and $\theta$ is the angle between the axis of the fibre 20 and the vertical.

This moment will cause a net rotation of the fibre 20 in an anticlockwise direction about the central point A. However, the angular momentum of the fibre 20 will carry it past the equilibrium position of vertical alignment. The resulting oscillation will be damped by friction with the fluid in between the electrode plates 10, 11 (air in this case), and may be described by the equation of motion:

$$I \frac{d^2\theta}{dt^2} = -\beta \frac{d\theta}{dt} - (\delta Q_2 - \delta Q_1) EL \cdot \sin(\theta),$$

Where $\beta$ is a damping constant and I is the moment of inertia of the fibre 20 about its midpoint diameter (as opposed to its major axis):

$$I = \tfrac{1}{4} mr^2 + \tfrac{1}{3} mL^2.$$

The second-order ordinary differential equation above has no analytical solution, however if it is assumed that the angular amplitude of the oscillations is 'small', then $\sin(\theta) \approx \theta$, and the differential equation may be re-written as:

$$I \frac{d^2\theta}{dt^2} + \beta \frac{d\theta}{dt} + \zeta\theta = 0.$$

Note that for convenience we have defined $\zeta$ as:

$$\zeta = (\delta Q_2 - \delta Q_1) EL.$$

The solutions to this equation have the form:

$$\theta = e^{\lambda t},$$

where $\lambda$ is a parameter given by:

$$\lambda = \frac{-\beta \pm \sqrt{\beta^2 - 4I\zeta}}{2I}$$

The discriminant value ($\beta_2 - 4I\zeta$) determines the type of damping that occurs. For $\beta^2 > 4I\zeta$ the oscillations of the fibre 20 are overdamped, for $\beta^2 < 4I\zeta$ they are underdamped and for $\beta^2 = 4I\zeta$ they are critically damped.

Expressed fully, we may say:

$$\theta(t) = e^{\frac{-\beta \pm \sqrt{\beta^2 - 4I\zeta}}{2I} t}$$

The net result of the rotational component of the motion will be that the fibre 20 is oriented with its length parallel to the electric field, and the end with the greater charge concentration ($\delta Q_2$) will be closer to the second, negatively charged plate 11.

The vertical motion of the fibre 20 is caused by the interaction of its net charge +Q with the electric field between the electrode plates 10, 11. The net force F on the fibre 20 due to this electric field is given by:

$$F = Q \frac{\sigma}{\epsilon_0 \epsilon_r}$$

Account should be given to the viscous drag on the fibre 20 due to its passage through the dielectric, which is assumed to be linear and acts antiparallel to the motion, in the negative x direction.

Account should also be given to the weight of the fibre 20, which will also act in the negative x direction whilst the buoyancy force W acts in the positive x direction.

This yields the following second-order linear inhomogeneous ordinary differential equation of motion:

$$F = m \frac{d^2x}{dt^2} = Q \frac{\sigma}{\epsilon_0 \epsilon_r} + W - \alpha \frac{dx}{dt} - mg$$

where $\alpha$ is a numerical drag coefficient determined by the shape of the fibre 20, m is its mass and g is the gravitational field strength. Note that $\alpha$ will not have the same value as $\beta$ in the rotational motion section as the cross-sections presented to the fluid by the fibre 20 will be different.

Re-writing this in a form that is more straightforward to solve:

$$\frac{d^2x}{dt^2} + \frac{\alpha}{m} \frac{dx}{dt} = Q \frac{\sigma}{m\epsilon_0 \epsilon_r} + \frac{W}{m} - g$$

This equation has the general solution:

$$x(t) = \frac{Cm}{\alpha}t + k_1 \frac{me^{-\frac{\alpha}{m}t}}{\alpha} + k_2$$

where $k_1$ and $k_2$ are unknown constants, and C is the constant term, equal to:

$$Q\frac{\sigma}{m\epsilon_0\epsilon_r} + \frac{W}{m} - g$$

By use of the initial conditions that the fibre 20 is stationary to begin with $$\left(\frac{dx}{dt} = 0\right)$$

and that it starts from a position adjacent the first, lowermost electrode plate 10 (x=0), we can solve for the unknown constants, and find that:

$$k_1 = \frac{m}{\alpha}C \text{ and } k_2 = -\frac{Cm^2}{\alpha^2}$$

Thus, the linear equation of motion for the fibre 20 is:

$$x(t) = \frac{Cm}{\alpha}\left(t + \frac{m}{\alpha}e^{-\frac{\alpha}{m}t} - \frac{m}{\alpha}\right)$$

Figures 3, 4, 5:
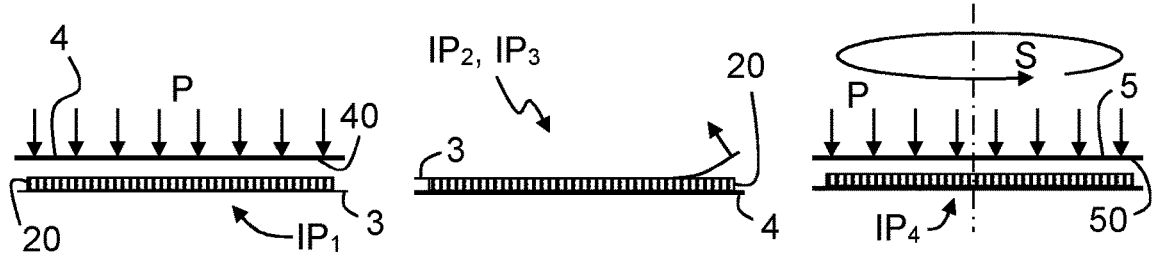
FIG. 3 illustrates the application of a second sheet to the first, oriented fibre carrying release sheet.
FIG. 4 illustrates the removal of the first sheet from the second, oriented fibre carrying sheet.
FIG. 5 illustrates the application of a third sheet to the second, oriented fibre carrying sheet to form a composite structure according to an embodiment of the invention.

Referring now to FIG. 3, the first sheet 3 carrying the oriented fibres 20, which can be referred to as a first preform or intermediate product IP$_1$, is removed from the second electrode plate 11, placed on a substrate with the fibres 20 uppermost. A second sheet 4 having a structural adhesive 40 on a major surface thereof is placed on top of the fibres 20 with the adhesive 40 facing the fibres 20. In this embodiment, the second sheet 4 is formed of a carbon fibre reinforced polymer material. Pressure P is then applied to the second sheet 4 to sandwich the fibres 20 between the first and second sheets 3, 4, thereby providing a second preform or intermediate product IP$_2$. At this point, the adhesive 40 of the second sheet 4 is preferably allowed or caused to dry or cure for a period sufficient to ensure that the fibres 20 are adhered to the second sheet 4 with a stronger bond than the pressure sensitive adhesive 30 of the first sheet 3, thereby providing a third preform or intermediate product IP$_3$.

Figure 6:
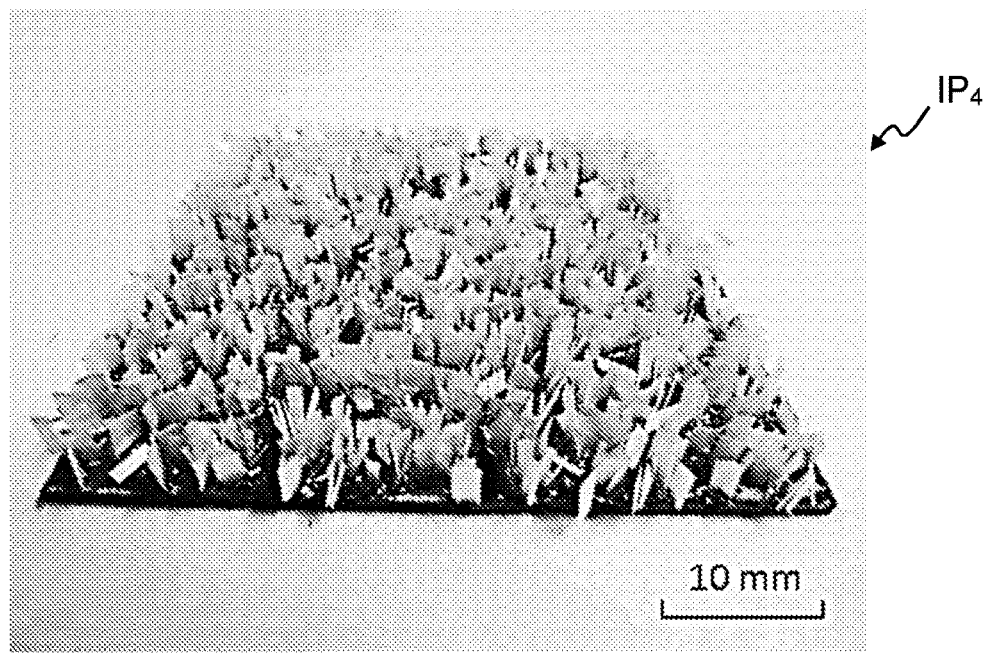
FIG. 6 is an image of the second, oriented fibre carrying sheet, which is an intermediate product of the method.

Referring now to FIG. 4, the second or third intermediate product IP$_2$, IP$_3$ is overturned so that the second sheet 4 is lowermost and the first, release sheet 3 is uppermost. When the adhesive 40 of the second sheet 4 is sufficiently dried or cured, the first, release sheet 3 is then peeled off the fibres 20, leaving a fourth preform or intermediate product IP$_4$ which is shown in FIG. 6.

As illustrated in FIG. 5, a third sheet 5 having a structural adhesive 50 on a major surface thereof is placed on top of the fibres 20 with the adhesive 50 facing the fibres 20. In this embodiment, the third sheet 5 is also formed of a carbon fibre reinforced polymer material. Pressure P is then applied to the third sheet 5 to sandwich the fibres 20 between the second and third sheets 4, 5, thereby providing a fifth preform or intermediate product IP$_6$.

In one embodiment, the adhesives 40, 50 of the second and third sheets 4, 5 are allowed or caused to dry or cure completely to provide a finished composite sheet. In another embodiment, this arrangement is a sixth preform or intermediate product IP$_6$ and fluid resin is then introduced, for example from one or more sides thereof, between the fibres 20 and the sheet is then rotated or spun S about its centre to expel excess resin. The resin is then dried or cured, for example using a heater (not shown) to provide a finished composite sheet.

Figure 7:
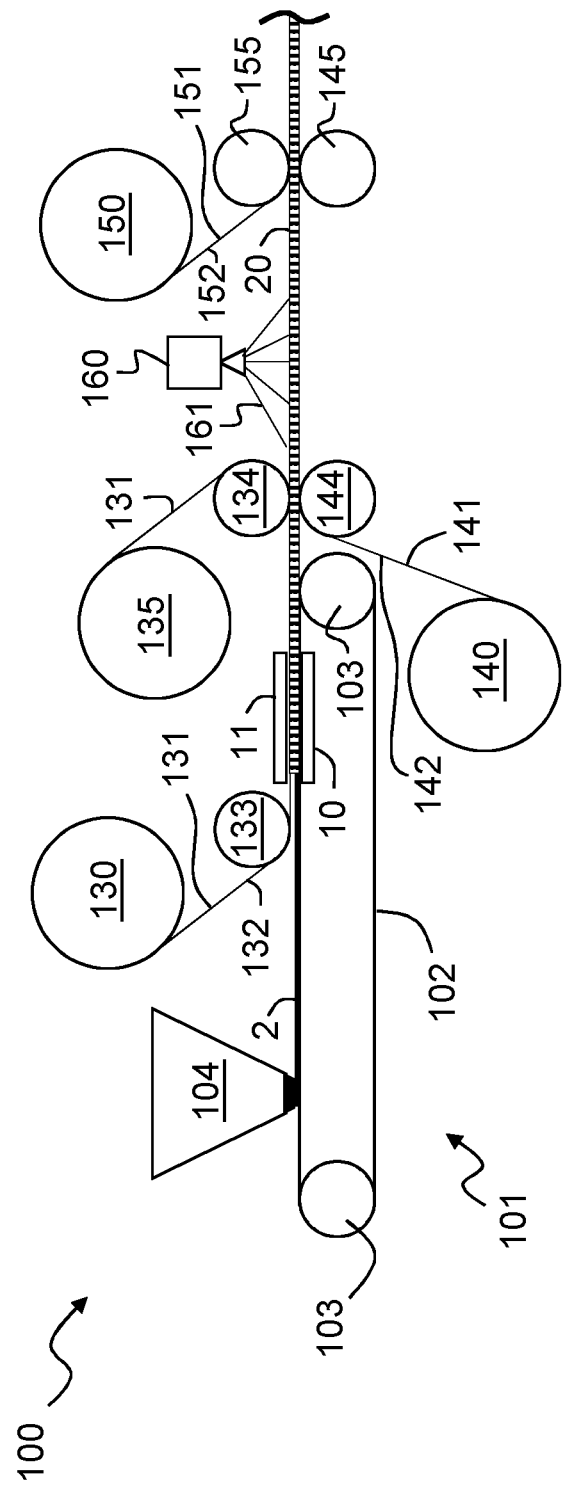
FIG. 7 is a schematic representation of an apparatus according to an embodiment of the invention for forming a composite sheet material.

Referring now to FIG. 7, there is shown an apparatus 100 according to a second embodiment of the invention similar to the first embodiment, wherein like references depict like features that will not be described further herein. The apparatus 100 according to this embodiment includes a conveyor 101 with an endless belt 102 that is driven between a pair of rollers 103 and which runs between the electrode plates 10, 11. A hopper 104 supplies fibres 20 onto the conveyor to form the bed 2 upstream of the electrode plates 10, 11.

The apparatus includes a supply means including first, second and third feed rollers 130, 140, 150 each carrying a respective first, second and third sheet material 131, 141, 151. The first sheet material 131 includes a pressure sensitive adhesive 132 on one major surface thereof, which is outermost on the first feed roller 130. The second sheet material 141 includes a structural adhesive 142 on one major surface thereof, which is innermost on the second feed roller 140. The third sheet material 151 also includes a structural adhesive 152 on one major surface thereof, which is outermost on the third feed roller 150.

The first feed roller 130 is above the conveyor 101 and feeds the first sheet material 131 between the bed 2 of fibres 20 and the second, uppermost electrode plate 10 via a first alignment roller 133 with the adhesive 132 facing the fibres 20. The electrode plates 10, 11 are energised to orient and move the fibres 20 from the bed 2 to adhere to the adhesive 132 in an orthogonal orientation as described above in relation to the first embodiment. The first sheet material 131 then passes out of the space between the electrodes 10, 11 and any of fibres 20 which are not adhered to the first sheet material 131 fall back into the bed 2 as described above in relation to the first embodiment. The first sheet material 131 is then fed between a first pair of sandwiching rollers 134, 144. The second feed roller 140 is below the conveyor 101 and also feeds the second sheet 141 into the sandwiching rollers 134, 144 below the first sheet material 131 with its adhesive 142 facing the fibres 20. The sandwiching rollers 134, 144 apply pressure to force the fibres 20 into the adhesive 142 of the second sheet material 141. The first sheet material 131 is then fed from the uppermost sandwiching roller 134 to an exhaust roller 135 to remove it from the fibres 20. In this embodiment, the sandwiching rollers 134, 144 are heated to encourage the adhesive 142 to dry or cure sufficiently to retain the fibres as the first sheet material 131 is removed.

The apparatus 100 also includes an optional resin introduction means in the form of a spray station 160 downstream of the first pair of sandwiching rollers 134, 144, which sprays resin 161 onto the layer of fibres 20 upstanding on the second sheet 141. The second sheet 141 with resin impregnated upstanding fibres 20 is then fed between a second pair of sandwiching rollers 145, 155. The third feed roller 150 feeds the third sheet 151 into the sandwiching rollers 145, 155 from above, such that the third sheet 151 is above the second sheet material with its adhesive 152 facing the fibres 20. The sandwiching rollers 145, 155 apply pressure to force the fibres 20 into the adhesive 152 of the third sheet material 151. In this embodiment, the second pair of sandwiching rollers 145, 155 are also heated to encourage the adhesive 142, 152 to dry or cure into the finished composite sheet material 160. The apparatus may also include downstream heaters for this purpose.

Figure 8:
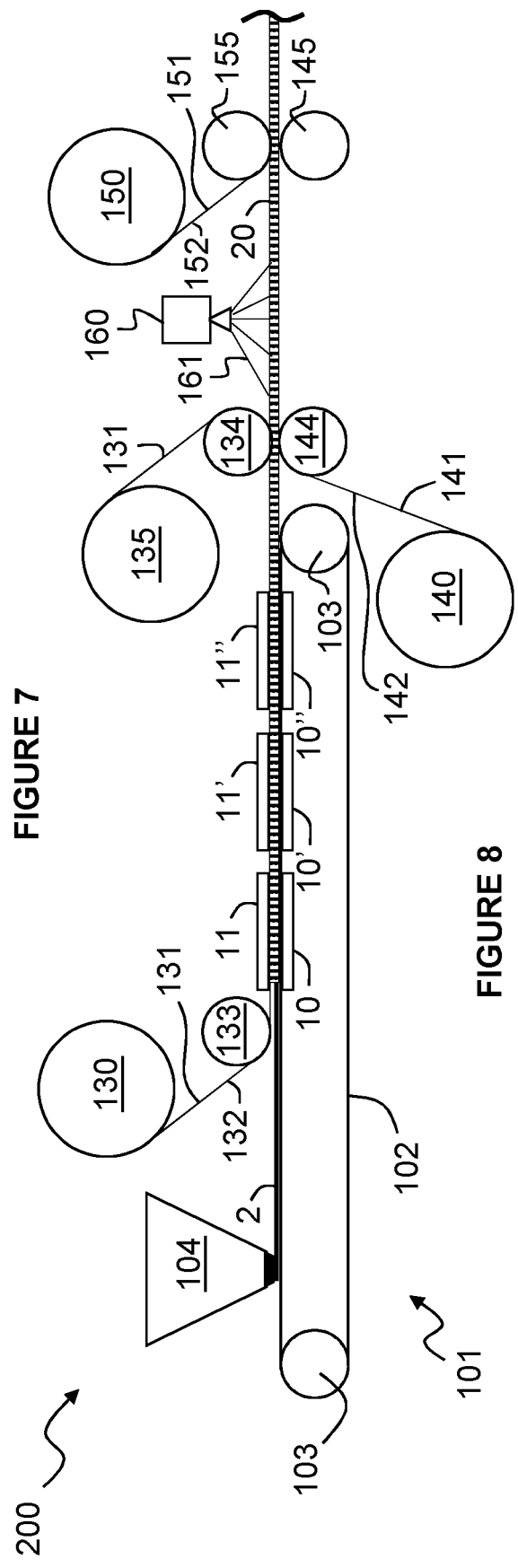
FIG. 8 is a schematic representation of an apparatus according to another embodiment of the invention for forming a composite sheet material.

Referring now to FIG. 8, there is shown an apparatus 200 according to a third embodiment of the invention similar to the apparatus 100 according to the second embodiment, wherein like references depict like features that will not be described further herein. The apparatus 200 according to this embodiment differs from that of the second embodiment in that two further pairs of electrodes 10', 11' and 10", 11" are included, which are spaced from one another to alternately apply, interrupt and reapply an electrostatic charge to the bed 2 of fibres 20 in order to create a more dense array of oriented fibres 20 on the first sheet material 131.

Referring now to FIG. 9, there is shown an apparatus 300 according to a fourth embodiment of the invention similar to the apparatus 100 according to the second embodiment, wherein like references depict like features that will not be described further herein. The apparatus 300 according to this embodiment differs from that of the second embodiment in that the first feed roller 130 carries the third sheet material 151 and the first, release sheet material 131 is omitted. Thus, the third sheet material 151 is used to capture the fibres 20 as they are oriented by the electrode plates 10, 11 and is then fed between the first pair of sandwiching rollers 134, 144, where the fibres 20 are sandwiched between the second and third sheet materials 141, 151. The spray station 160 is located beneath the third sheet material 151 from which the oriented fibres 20 depend and sprays resin 161 thereon as it enters the sandwiching rollers 134, 144. This is a simplified process, but it may limit the selection of sheet material 151 to ensure that the electrostatic field permeates therethrough.

Referring now to FIG. 10, there is shown an apparatus 400 according to a fifth embodiment of the invention similar to the apparatus 300 according to the fourth embodiment, wherein like references depict like features that will not be described further herein. The apparatus 400 according to this embodiment differs from that of the fourth embodiment in that the pair of electrodes 10, 11 is replaced with a series of three movable electrode pairs 410, 411, 410', 411' and 410", 411". Each of the electrode pairs 410, 411, 410', 411' and 410", 411" is movable relative to the bed 2 of fibres 20 in order to orient fibres 20 in one or more predetermined regions and/or according to a predetermined pattern to provide a pattern of oriented fibres 20 in the composite sheet material. It will be appreciated that the electrode pairs 410, 411, 410', 411' and 410", 411" may be used to alternately apply, interrupt and reapply an electrostatic charge to the regions of the bed 2 of fibres 20 in order to create the desired array density of oriented fibres 20.

In each of the above-specified apparatus a resin spray station 160 (or other resin application means) may be provided. The resin application means may provide resin across the entire composite sheet or across portions thereof. For example, where the fibres have been patterned (for example using a patterned or localised electrode) the resin may be applied to areas where there are fibres and not to areas which are intended to provide free channels.

Once the third sheet material 141 has been applied the composite product may be formed into a non-rectilinear shape and then the adhesives (and/or resin if applied) cured to retain the non-rectilinear shape. Alternatively, the composite product may be cut to a desired shape and then formed into a desired profile shape.

Figure 11:
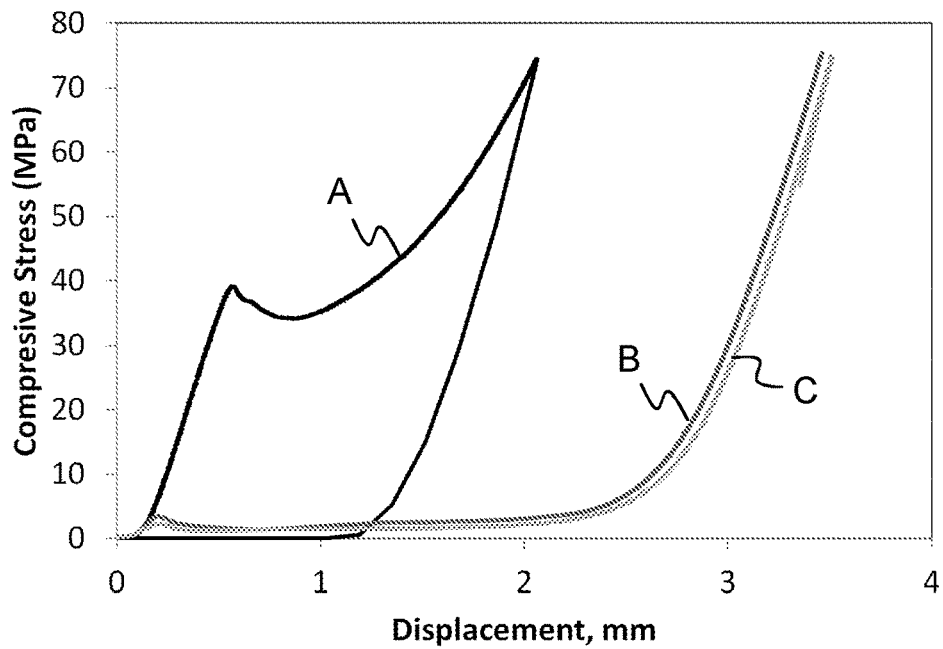
FIGS. 11 and 12 are graphs illustrating the performance of a composite sheet formed in accordance with the present invention as compared with alternative composite structures.
Figure 12:
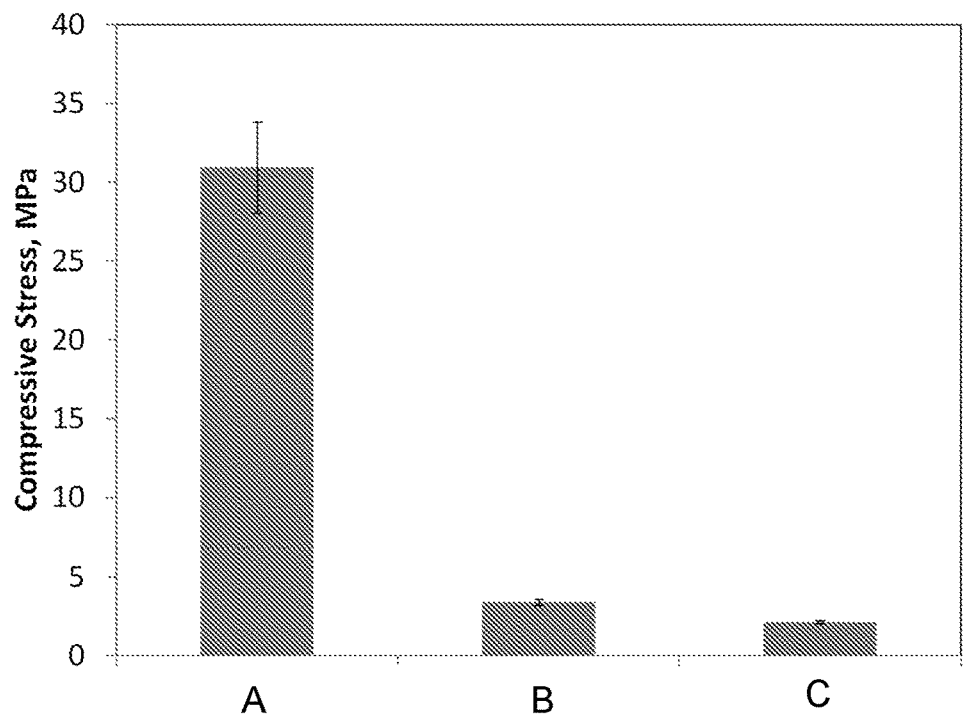

FIG. 11 illustrates the results of a lateral compression test in which a composite sheet material A made in accordance with the method invention illustrated in FIG. 1-6 was compared with those of an aluminium honeycomb composite sheet material B and a Nomex honeycomb sheet material C. The composite sheet material A was constructed using E-glass fibres having an average length of 3 mm sandwiched between a pair of sheets formed of a unidirectional carbon fibre prepreg in an epoxy resin. The honeycomb composite sheets B, C were constructed using 3 mm cell structures also sandwiched between a pair of sheets formed of a unidirectional carbon fibre prepreg in an epoxy resin. FIG. 12 illustrates the maximum compressive strength achieved by each of the composite sheet materials A, B, C in a series of compression tests.

It will be appreciated by those skilled in the art that several variations to the aforementioned embodiments are envisaged without departing from the scope of the invention. It will also be appreciated by those skilled in the art that any number of combinations of the aforementioned features and/or those shown in the appended drawings provide clear advantages over the prior art and are therefore within the scope of the invention described herein.

The invention claimed is:

1. A method of forming a composite sheet material, the method comprising locating a first sheet adjacent to a second of a pair of electrodes, energising the pair of electrodes to apply an electrostatic charge to a bed of fibres located therebetween thereby orienting at least some of the fibres of the bed of fibres to be substantially orthogonal to the pair of electrodes and adhered to the first sheet, and sandwiching at least some of the oriented fibres between the first sheet and a second sheet, and subsequently removing the first sheet, comprising subsequent to removing the first sheet, sandwiching at least sonic of the oriented fibres between the second sheet and a third sheet.

2. The method according to claim 1, wherein t bed of fibres is located in a first position adjacent a first of the pair of electrodes, the method further comprising positioning the first sheet between the bed of fibres and the second of the pair of electrodes, and energising the pair of electrodes causes at least some of the fibres to move from the bed of fibres toward the second electrode of the pair of electrodes such that at least some of the fibres attach or adhere to the first sheet in the orthogonal orientation.

3. The method according to claim 1, comprising positioning the second sheet with an adhesive surface thereof facing oriented fibres attached or adhered to the first sheet such that sandwiching the fibres causes at least some of the fibres to adhere to the adhesive surface of the second sheet.

4. The method according to claim 1, comprising positioning a third sheet with an adhesive surface thereof facing oriented fibres attached or adhered to the second sheet such that sandwiching them causes at least some of the oriented fibres to adhere to the adhesive surface of the third sheet.

5. The method according to claim 1, wherein the first sheet comprises a pressure sensitive or non-curable adhesive and the second sheet, comprises a structural or curable adhesive.

6. The method according to claim 1, comprising introducing resin between at least some of the oriented fibres.

7. The method according to claim 1, further comprising alternately interrupting and reapplying an electrostatic charge to the bed of fibres to orient at least some of the fibres to be substantially orthogonal to the electrodes prior to sandwiching at least some of the oriented fibres between a pair of sheets.

8. The method according to claim 1, wherein at least one of the electrodes is patterned to provide a pattern of oriented fibres in the composite sheet material.

9. The method according to claim 1, comprising moving at least one of the electrodes to orient fibres in one or more predetermined regions and/or according to a predetermined pattern to provide a pattern of oriented fibres in the composite sheet material.

* * * * *

UNITED STATES PATENT AND TRADEMARK OFFICE
CERTIFICATE OF CORRECTION

PATENT NO. : 11,167,524 B2
APPLICATION NO. : 16/306772
DATED : November 9, 2021
INVENTOR(S) : Fernando et al.

Page 1 of 1

It is certified that error appears in the above-identified patent and that said Letters Patent is hereby corrected as shown below:

In the Claims

Claim 1, Column 14, Line 38 should read as follows: "wiching at least some of the oriented fibres between the"

Claim 2, Column 14, Line 40 should read as follows: "2. The method according to claim 1, wherein the bed of"

Signed and Sealed this
Third Day of May, 2022

Katherine Kelly Vidal
*Director of the United States Patent and Trademark Office*